US010746538B2

(12) United States Patent
Stigall et al.

(10) Patent No.: US 10,746,538 B2
(45) Date of Patent: Aug. 18, 2020

(54) METHOD AND APPARATUS FOR DIGITAL THREAD INSPECTION

(71) Applicant: Tubular Solutions, Inc., Houston, TX (US)

(72) Inventors: Aubrey A. Stigall, Houston, TX (US); Timothy M. Bedore, Houston, TX (US); Braydon C. Stigall, Richmond, TX (US); Jeremy H. Melder, Woodworth, LA (US)

( * ) Notice: Subject to any disclaimer, the term of this patent is extended or adjusted under 35 U.S.C. 154(b) by 0 days.

(21) Appl. No.: 16/155,274

(22) Filed: Oct. 9, 2018

(65) Prior Publication Data

US 2019/0063906 A1    Feb. 28, 2019

Related U.S. Application Data

(63) Continuation of application No. 15/810,358, filed on Nov. 13, 2017, now Pat. No. 10,119,810.

(Continued)

(51) Int. Cl.
*G01B 11/245* (2006.01)
*G01B 11/12* (2006.01)
(Continued)

(52) U.S. Cl.
CPC .......... *G01B 11/245* (2013.01); *G01B 11/12* (2013.01); *G01B 11/2408* (2013.01); *G01B 17/06* (2013.01); *F16L 2101/30* (2013.01)

(58) Field of Classification Search
CPC .. F16L 2101/30; G01B 11/12; G01B 11/2408; G01B 11/245; G01B 17/06;
(Continued)

(56) References Cited

U.S. PATENT DOCUMENTS 3,327,205 A * 6/1967 Wood ................ G01B 5/204
324/220
4,739,273 A    4/1988 Petersen et al.
(Continued)

FOREIGN PATENT DOCUMENTS

AU        2011100208 A4    3/2011

OTHER PUBLICATIONS

PCT International Search Report, Written Opinion and Preliminary Report on Patentability.

*Primary Examiner* — Tri T Ton
(74) *Attorney, Agent, or Firm* — Ted M. Anthony

(57) ABSTRACT

A compact inspection assembly comprising digital sensors and/or laser measurement systems to validate attributes of pipe and associated threaded connections. An elongate body member is partially inserted into a central bore of a pipe section. A stabilizing centralizer assembly is selectively expanded to engage against the inner surface of the pipe section and prevent axial and rotational movement of the body section relative to the pipe section. An automated sensor assembly, attached to the body member and positioned in proximity to a threaded connection, measures data regarding the pipe and associated threaded connections. The measured and recorded data can be compared to predetermined standards (such as, for example, original equipment manufacturer and/or end user specifications or requirements) to verify pipe/connection compliance with desired standards.

8 Claims, 15 Drawing Sheets

Related U.S. Application Data

(60) Provisional application No. 62/421,615, filed on Nov. 14, 2016.

(51) Int. Cl.
  *G01B 11/24* (2006.01)
  *G01B 17/06* (2006.01)
  *F16L 101/30* (2006.01)

(58) Field of Classification Search
  CPC ... G06F 3/0482; G06Q 10/025; H04L 51/046; H04L 65/40
  USPC .................................................. 356/600–640
  See application file for complete search history.

(56) References Cited

U.S. PATENT DOCUMENTS

| | | | | |
|---|---|---|---|---|
| 4,997,274 | A * | 3/1991 | Takakusagi | G01B 5/012 |
| | | | | 33/503 |
| 8,804,104 | B2 * | 8/2014 | Honda | G01B 5/163 |
| | | | | 356/72 |
| 2003/0076509 | A1 | 4/2003 | Ngo | |
| 2008/0092672 | A1 * | 4/2008 | Gibson | F16L 55/30 |
| | | | | 73/865.8 |
| 2011/0238199 | A1 * | 9/2011 | Bonadeo | G01B 11/2425 |
| | | | | 700/109 |
| 2014/0360036 | A1 | 12/2014 | Moreau et al. | |

* cited by examiner

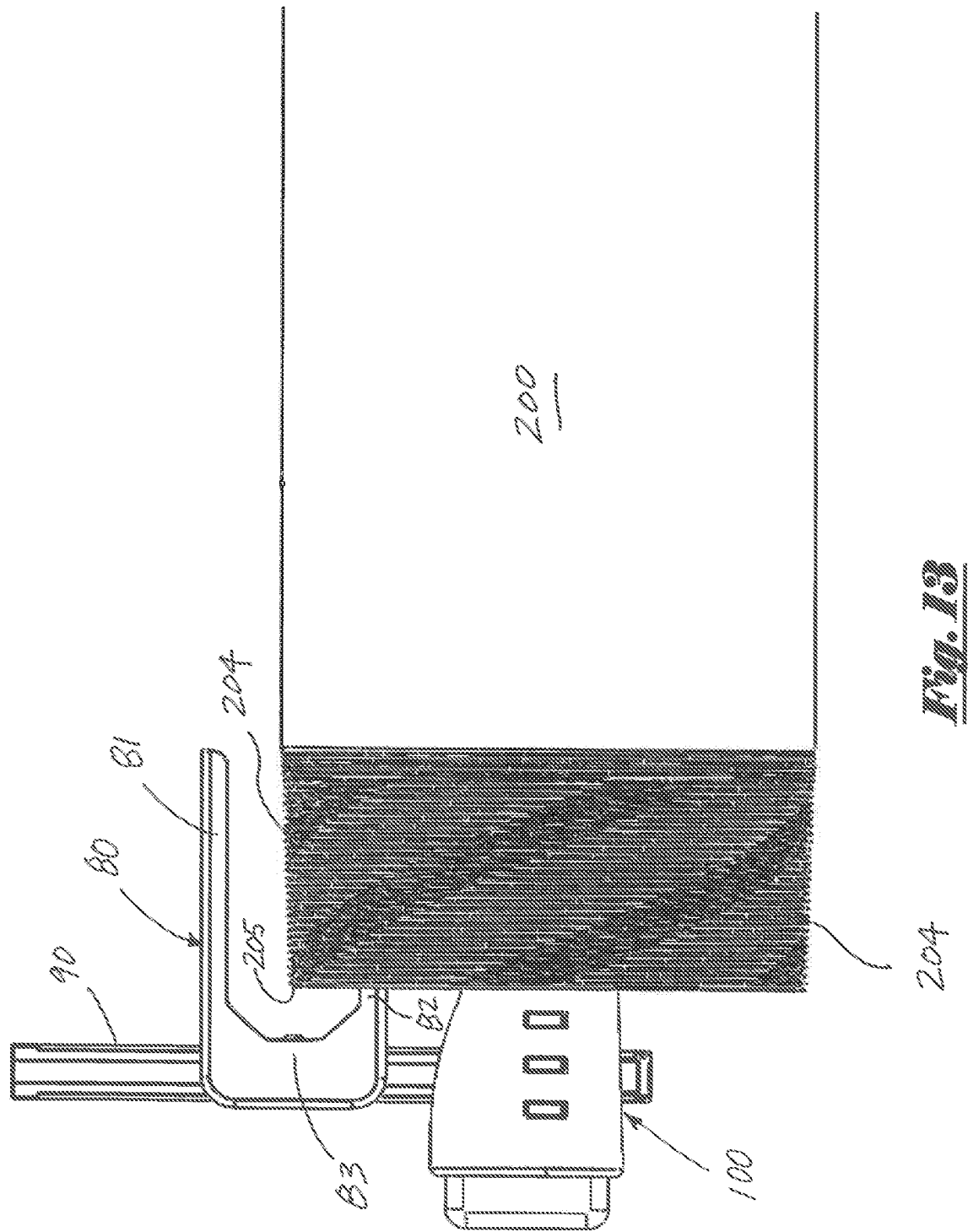

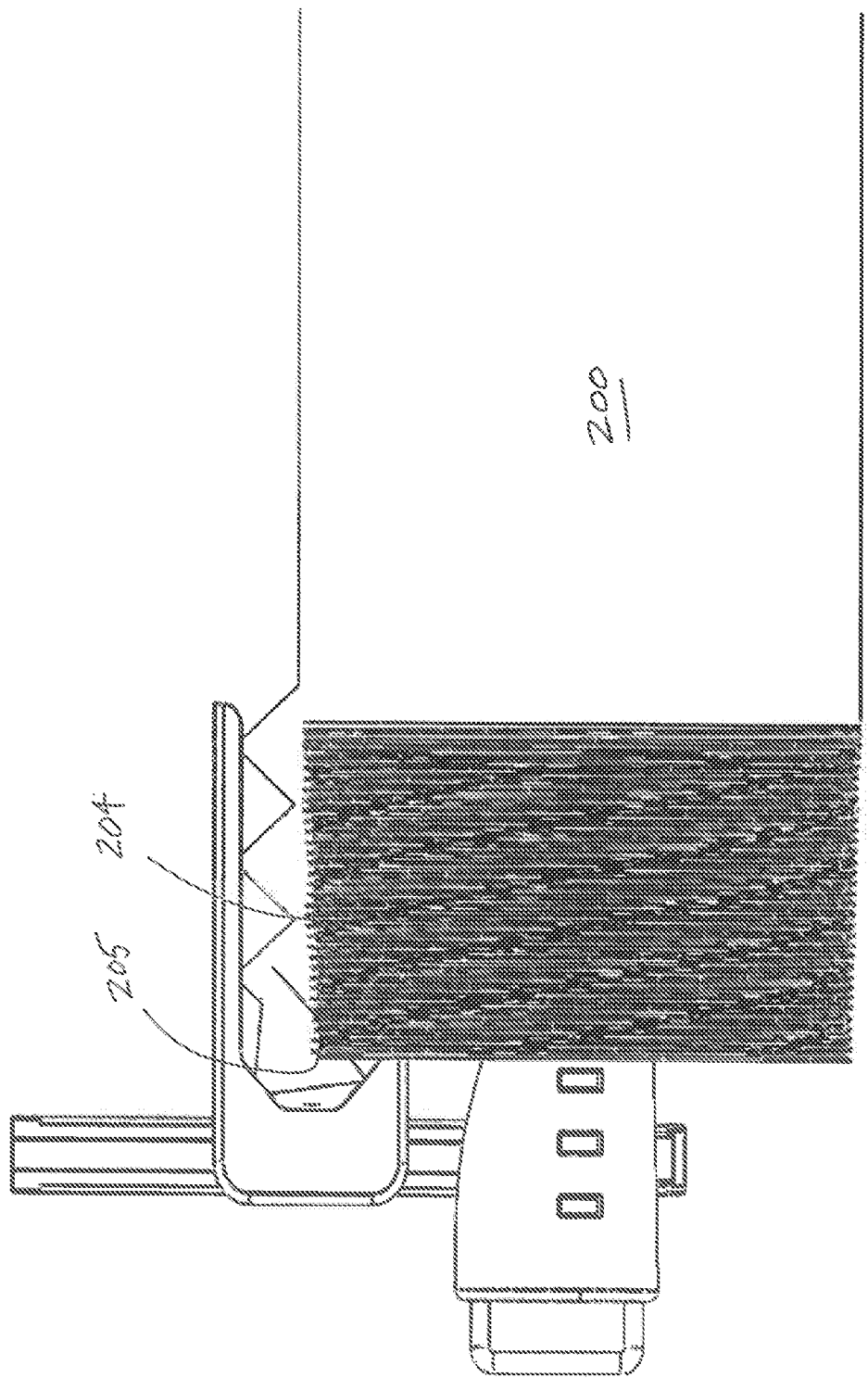

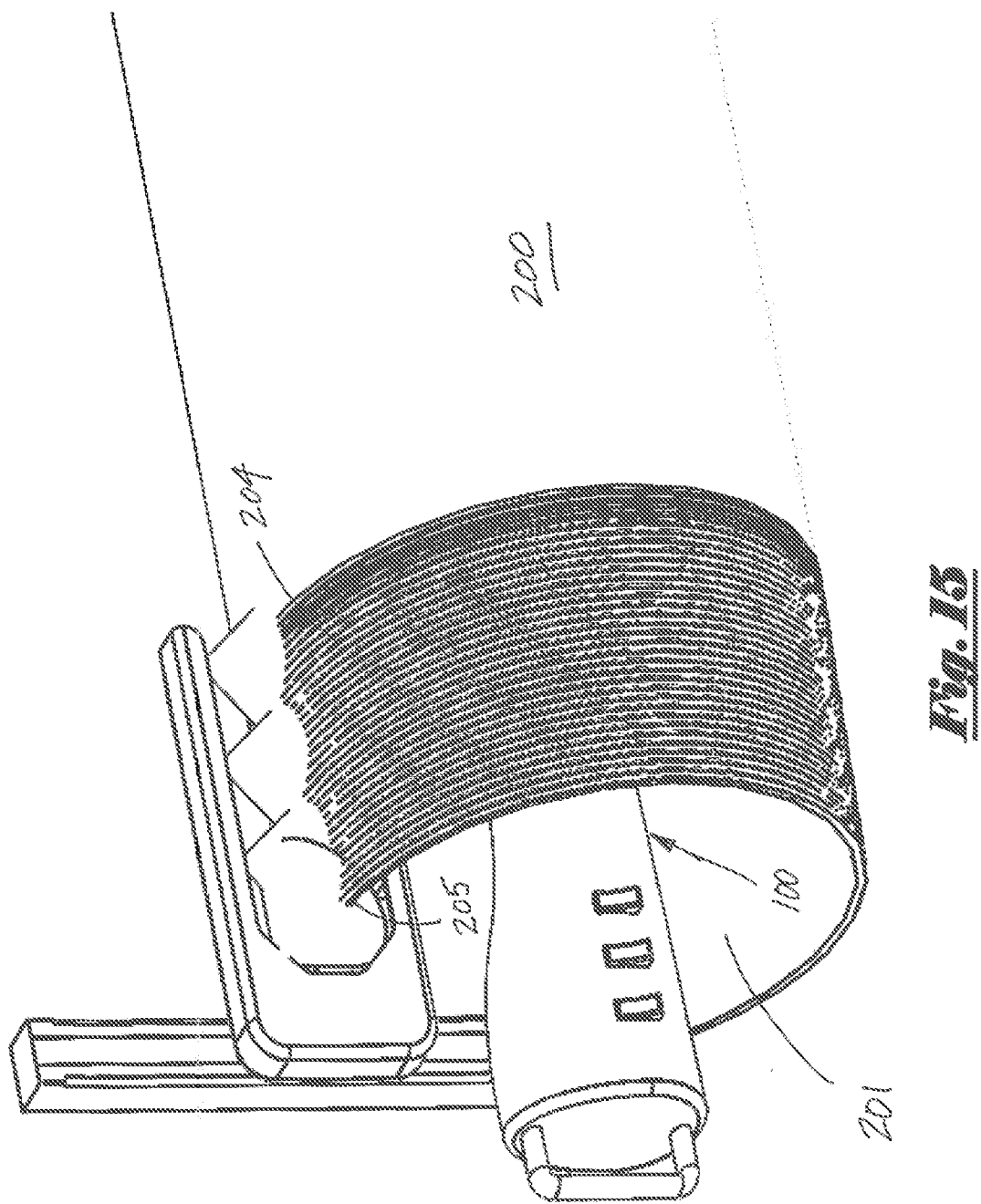

METHOD AND APPARATUS FOR DIGITAL THREAD INSPECTION

CROSS REFERENCES TO RELATED APPLICATIONS

This application is a continuation of U.S. patent application Ser. No. 15/810,358, filed Nov. 13, 2017, which claims priority of U.S. Provisional patent application Ser. No. 62/421,615, Filed Nov. 14, 2016, all incorporated herein by reference.

STATEMENTS AS TO THE RIGHTS TO THE INVENTION MADE UNDER FEDERALLY SPONSORED RESEARCH AND DEVELOPMENT

None.

BACKGROUND OF THE INVENTION

1. Field of the Invention

The present invention comprises a method and apparatus for comprehensive digital inspection of pipe sections and other tubular goods including, without limitation, threaded connections thereof. More particularly, the present invention comprises a method and apparatus for comprehensive digital inspection of pipe sections and other tubular goods, as well as associated threaded connections, in order to measure a variety of data including, without limitation, tube length, inside diameter ("ID") and outer diameter ("OD"), and threaded connection data and characteristics. More particularly still, the present invention comprises a method and apparatus for comprehensive digital inspection of pipe sections and other tubular goods, as well as associated threaded connections, utilizing some combination of integrated laser measurement, optical sensors, phased-array and/or UT technology.

2. Brief Description of the Prior Art

Pipe (such as, for example, casing, drill pipe and/or other tubular goods) is commonly used in the oil and gas industry, as well as other applications. Such pipe is typically utilized in sections having a length of thirty feet or more, as well as various length pup joints, accessories or other components that may be utilized in a pipe string design. Each pipe section—commonly referred to as a "joint"—typically has a threaded connection disposed at each axial end. In some cases, a pipe section has one male or "pin-end" connection at one end, and a female or "box-end" connection at the other end. In other cases, pipe sections have male or pin-end connections at both ends and can be joined together using an internally threaded coupling or collar member.

In order to ensure safety and operational integrity, such pipe sections and the associated threaded connections are routinely inspected for quality assurance purposes. Conventional thread inspection methods are typically performed using an inspector's naked eye—the inspector visually inspects a pipe section and its threaded connections, and thereafter assigns a qualitative grade or rating to said connections based on the inspector's visual observation and subjective determination.

Such visual thread inspection, commonly referred to as "VTI", suffers from a number of significant limitations. Grading can vary between inspectors, and external conditions and/or environmental factors can also impact the quality of VTI and the associated results. Put another way, such conventional VTI methods rely entirely on human interaction and interpretation for accuracy and compliance; as such, said conventional methods of VTI can be inconsistent and subject to human error. In some cases, improperly inspected or inconsistently graded threaded connections can result in problems (which can sometimes be catastrophic) when pipe is subsequently used during operations.

Thus, there is a need for an improved method and apparatus for inspecting pipe sections including, without limitation, threaded connections thereof. Such improved method and apparatus should account for differences in environmental conditions, while reducing—if not entirely eliminating—human error and inspector subjectivity. Further, such improved method and apparatus should be effective, as well as relatively inexpensive and easy to deploy and utilize.

SUMMARY OF THE PRESENT INVENTION

The present invention comprises a method and apparatus for digital inspection of pipe sections and associated threaded connections. In a preferred embodiment, the present invention comprises a compact and easy to use inspection assembly employing digital imaging and laser measurement systems to validate desired attributes of a threaded pipe connection including, without limitation, verification against known standards (such as, for example, original equipment manufacturer ["OEM"] and/or end user specifications). Further, the method and apparatus of the present invention utilizes specifically calibrated equipment to verify threaded connection characteristics without requiring or relying on human subjectivity for accuracy and compliance.

In a preferred embodiment, the digital inspection assembly of the present invention comprises a substantially cylindrical elongate body member. A selectively expandable centralizer assembly is attached to said elongate body member and can alternate between a first "collapsed" position and second "extended" position. In said first collapsed position, said centralizer assembly is positioned against or in relatively close proximity to the outer surface of said elongate body member. In said second extended position, said centralizer assembly is expanded radially outward from said elongate body member in order to engage against the inner surface of a pipe section.

A digital sensor mounting assembly having a plurality of digital cameras, laser optics (such as 2D/3D laser digital sensors) and/or optical digital sensors is rotatable relative to said central elongate body member for obtaining optical images of (male or female) threaded connections. In a preferred embodiment, said digital sensor assembly is positioned in proximity to a threaded connection and can be rotated 360 degrees about a longitudinal axis of said central elongate body member, thereby permitting said digital sensor assembly to inspect the entire circumference of a threaded connection.

The digital inspection assembly of the present invention can be motorized, allowing for automated rotation at a constant or adjustable rotational speed. Additionally, controlled lighting and imaging systems provide for enhanced accuracy and calibrated imaging. The digital inspection assembly of the present invention can accommodate pipe and other tubular goods having virtually any diameter.

Further, in a preferred embodiment, said digital inspection assembly provides for self-centering, auto-focus and desired alignment relative to a pipe section and associated threaded connection. Although other methods can be envisioned without departing from the scope of the present invention, such functions are controlled using Computer Numerically Controlled ("CNC") software and control systems.

An automated laser length and pipe diameter measurement system, which can also be controlled by custom-designed software, utilizes at least one laser measurement tool and permits accurate measurement of pipe section length, internal diameter and pipe ovality. When two opposing digital inspection assemblies are utilized (one at each end of a pipe section), said two-station system can be synced with each other for inspection optimization. In such scenarios, multiple threaded connections can be inspected simultaneously, with lighting, imaging, motor automation and laser applications working together, while being controlled from a common or central control panel.

The digital inspection assembly of the present invention can be portable, allowing for mobile deployment and use at virtually any location (such as, for example, pipe yards, mills, rigs, remote or other locations). In an alternative embodiment, said digital inspection assembly can be hand held, mounted to a temporary support structure, or permanently supported. Modular design of the digital inspection assembly allows for incorporation of additional components and complete remote automation.

Measured data can be utilized with an automated pipe grade verification system, and/or stored on a cloud-based data storage system. Further, such measured data can be accessed for comparison and/or verification that: connection attributes are within OEM or other standards for acceptable connection tolerances, ovality is within desired API or other specifications or standards, and/or connection tolerances for mating pin and box connections will ensure optimal connection performance in operation. Additionally, data from laser topography and/or digital optical sensor(s) can verify that any defects are within acceptable tolerances relative to OEM specifications and/or other applicable standards.

Additionally, real time data acquisition and Wi-Fi connectivity allows for remote viewing of measured data worldwide (including, without limitation, GSM, 3G, 4G, Bluetooth, Wi-Fi, satellite and/or cabled networks). PDF or other specific application conversion of all images, lengths, defects, acceptance criteria and all system set up parameters for electronic report generation and delivery. Said assembly can beneficially operate off of external power and does not require an internal battery for operation The digital inspection assembly of the present invention can permit inspection of multiple attributes of male and/or female threaded connections including, without limitation, the following: thread image, nose image, seal area, shoulders, relief grooves, roots, crests, pitch (including variable pitch), diameter, pipe OD, pipe ID, pipe ovality and/or other measurable variables. A report containing captured data and any analysis can be automatically generated and forwarded to desired recipients. Connection inspection information can be numbered, time-stamped and dated.

In a preferred embodiment, the digital inspection assembly of the present invention can be operated and utilized by a single person. Further, the digital inspection assembly is accurately repeatable (i.e. duplicate inspections of the same pipe/connection will yield identical results within measurement tolerances).

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed. Further, dimensions, materials and part names are provided for illustration purposes only and not limitation.

FIG. 13 depicts a side view of a digital inspection assembly of the present invention after being inserted into a central bore of a pipe section.

FIG. 14 depicts a side view of a digital inspection assembly of the present invention after being inserted into a central bore of a pipe section during digital inspection of a threaded connection.

FIG. 15 depicts a rear perspective view of a digital inspection assembly of the present invention after being inserted into a central bore of a pipe section during digital inspection of a threaded connection.

DETAILED DESCRIPTION OF A PREFERRED EMBODIMENT OF THE INVENTION

Figure 1:
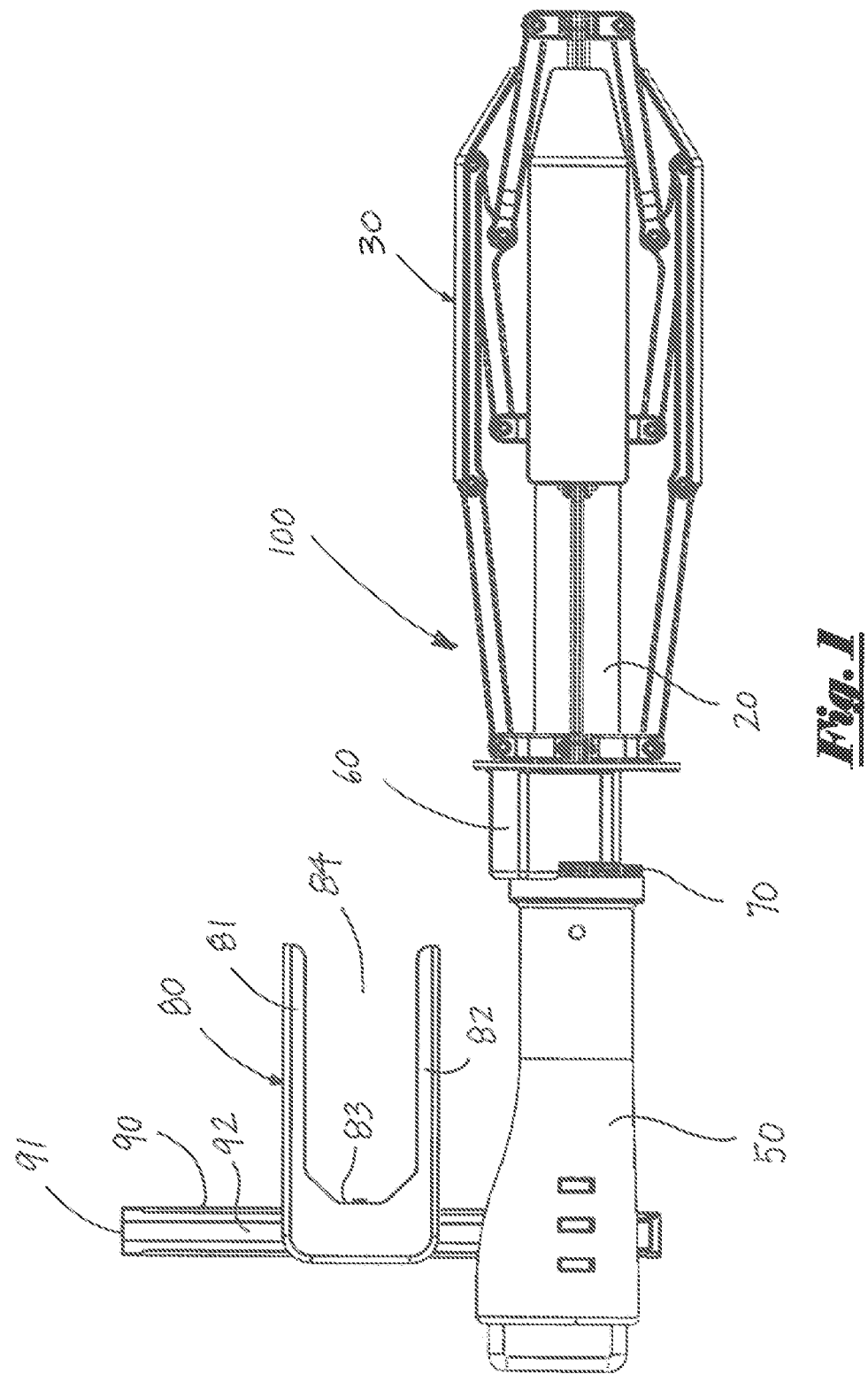
FIG. 1 depicts a side view of a digital inspection assembly of the present invention having a centralizer assembly in a substantially collapsed configuration.

FIG. 1 depicts a side view of a digital inspection assembly 100 of the present invention in a substantially collapsed position. Digital inspection assembly 100 generally comprises central body or tube member 20 attached to handle assembly 50. In a preferred embodiment, tube member 20 and handle assembly 50 are attached in axial alignment with each other, but are capable of relative rotation about said common longitudinal axis.

Figure 4:
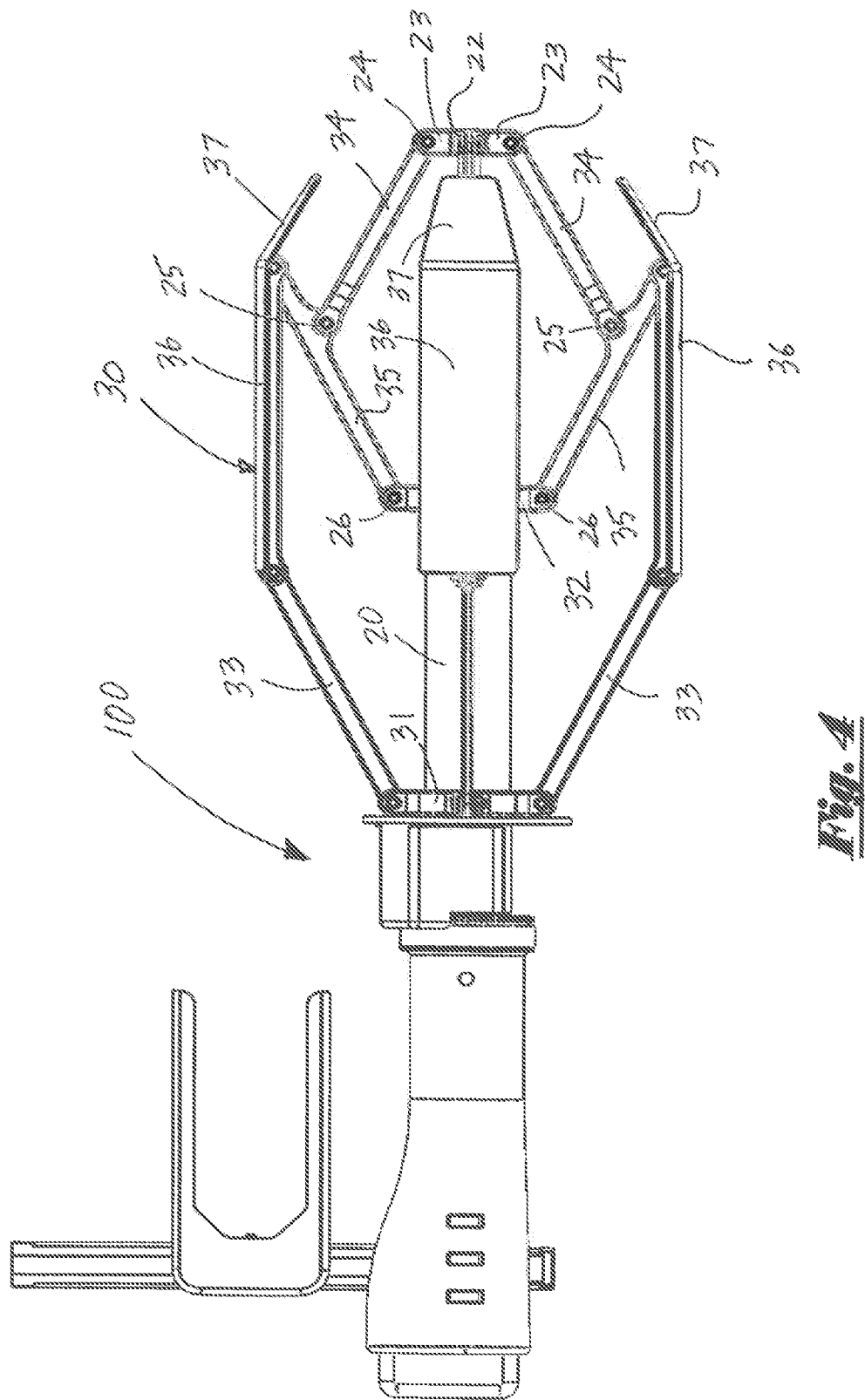
FIG. 4 depicts a side view of a digital inspection assembly of the present invention having a centralizer assembly in a substantially extended configuration.

Centralizer assembly 30 is generally disposed along the outer surface of said central tube member 20. Said centralizer assembly 30 can be selectively alternated between a first retracted or "collapsed" (radially inward) position as depicted in FIG. 1, and a second "extended" (radially outward) position, as depicted in FIG. 4, for example, and more fully described below.

Linear mounting arm 90 is fixedly attached to handle assembly 50. In a preferred embodiment, the longitudinal axis of linear mounting arm 90 is disposed substantially perpendicular orientation to the aligned longitudinal axes of handle assembly 50 and central tube member 20. Digital sensor mounting assembly 80 is slidably disposed on elongate track member 92 formed by linear mounting arm 90; said digital sensor mounting assembly 80 can be moved along the length of said linear mounting arm 90 between handle assembly 50 and distal end 91, and selectively secured or locked in place at a desired position along the length of said track member 92.

In a preferred embodiment, digital sensor mounting assembly 80 forms a substantially U-shaped structure having first leg member 81, second leg member 82 and inner crown section 83. Further, in said preferred embodiment, said first leg member 81 and second leg member 82 are oriented substantially parallel to each other, defining throat area 84 extending into a gap or space formed between said first leg member 81 and second leg member 82.

Stepper motor 60 is attached to central tube member 20, while rotation gear 70 is attached to handle assembly 50. Said stepper motor 60 rotates a drive gear (not depicted in FIG. 1) operationally engaged with rotation gear 70; actuation of said stepper motor 60 results in application of torque forces to handle assembly 50, thereby causing handle assembly 50 to rotate about is longitudinal axis, even when central tube member 20 remains stationary and/or is prevented from rotation relative to said handle assembly 50.

Figure 2:
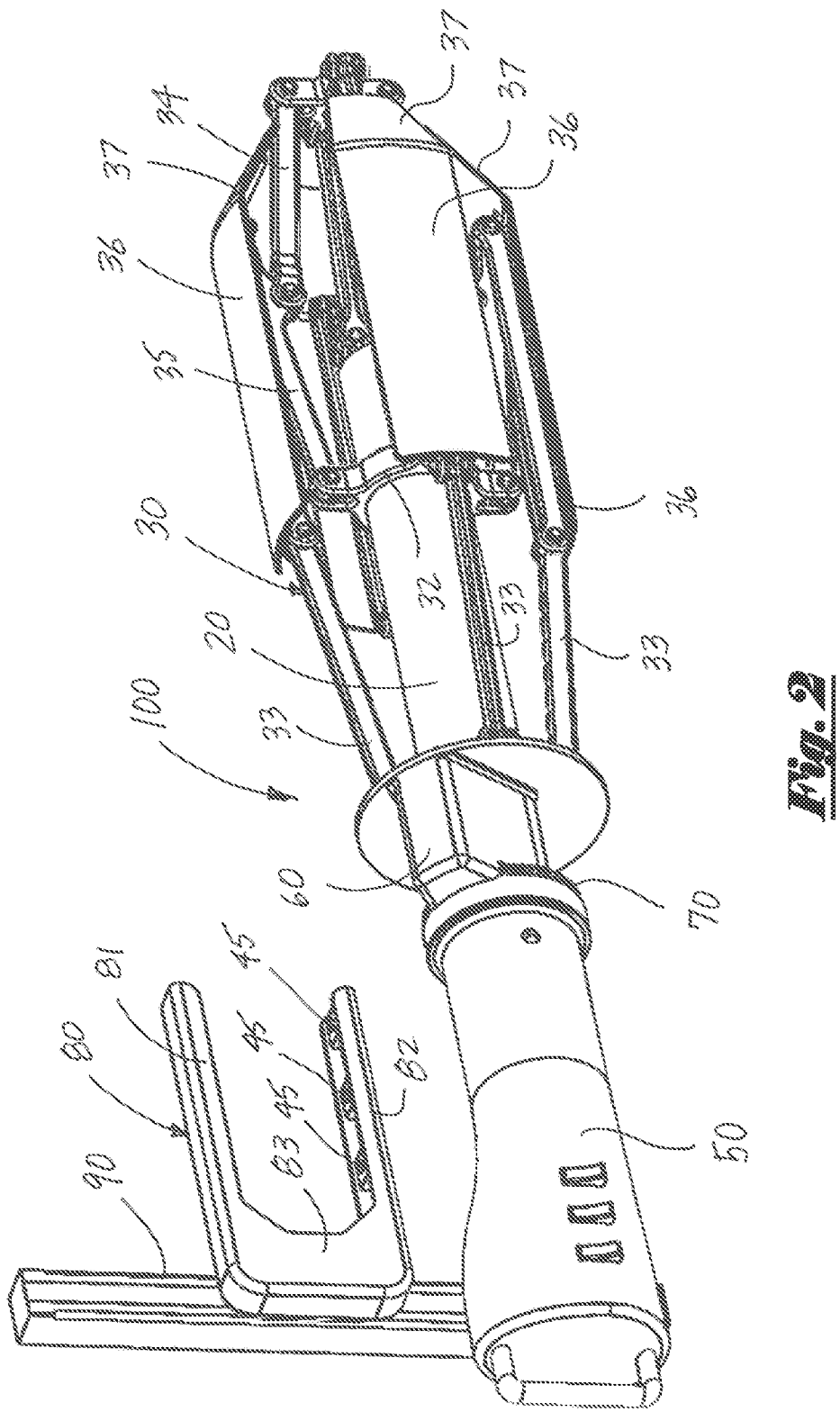
FIG. 2 depicts a rear perspective view of a digital inspection assembly of the present invention having a centralizer assembly in a substantially collapsed configuration.
Figure 3:
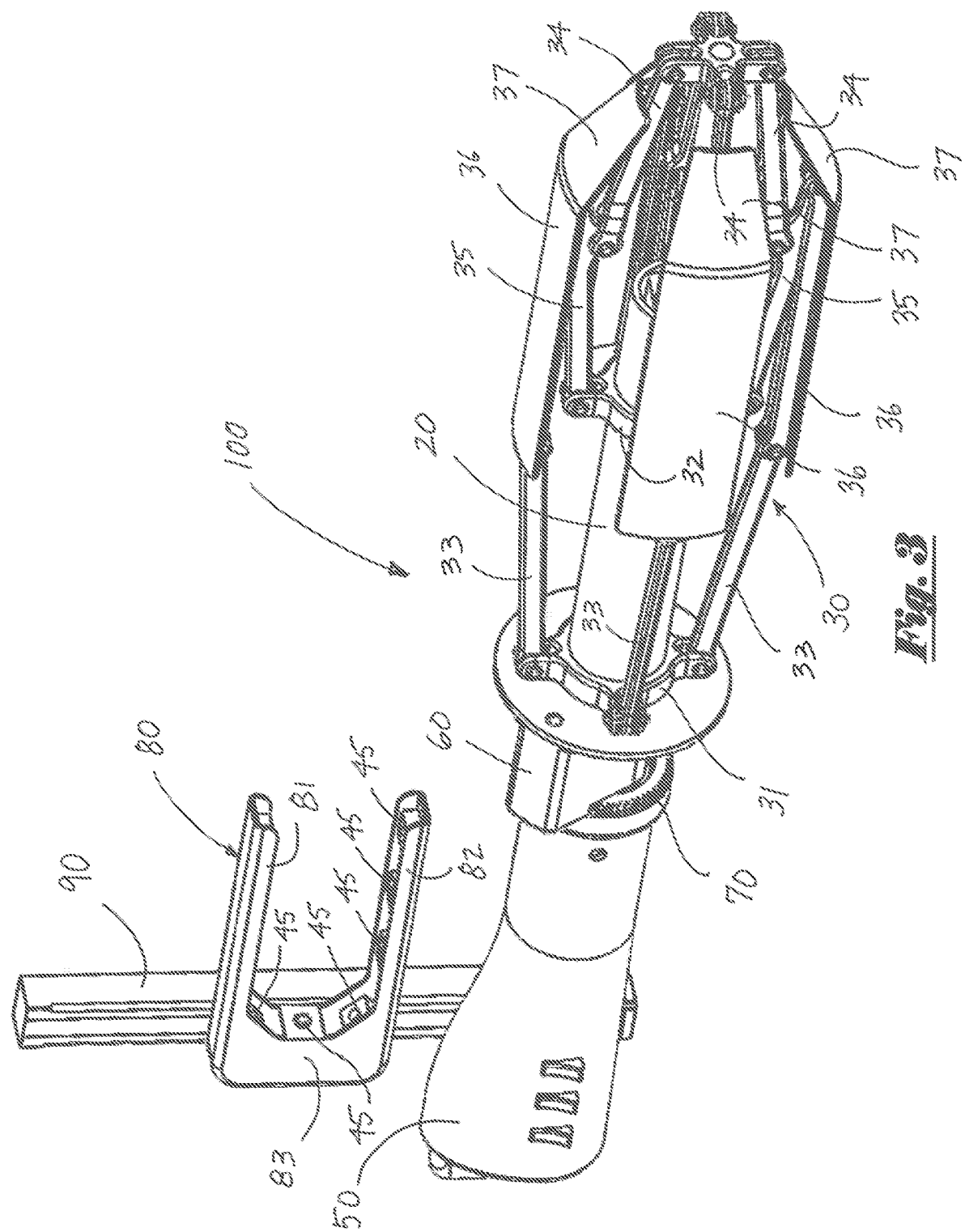
FIG. 3 depicts a front perspective view of a digital inspection assembly of the present invention having a centralizer assembly in a substantially collapsed configuration.

FIG. 2 depicts a rear perspective view of a digital inspection assembly 100 of the present invention in a substantially collapsed position, while FIG. 3 depicts a front perspective view of said digital inspection assembly 100. Digital inspection assembly 100 generally comprises central tube member 20 attached to handle assembly 50. Tube member 20 and handle assembly 50 are attached in axial alignment with each other, but are capable of rotation relative to each other about a common longitudinal axis.

Centralizer assembly 30 is disposed along the outer surface of said central tube member 20. As depicted in FIGS. 2 and 3, said centralizer assembly 30 is illustrated in a first "collapsed" (radially inward) position. In a preferred embodiment, said centralizer assembly 30 comprises stationary collar 31 (not visible in FIG. 2), traveling collar 32, upper rib members 33, lower rib members 34, pusher rib members 35 and outer pad members 36.

Although the specific design of said pad members 36 can vary without departing from the scope of the present invention, in a preferred embodiment said pad members 36 further comprise a substantially convex or curved outer surface area, as well as tapered and substantially inwardly-facing nose section 37. Traveling collar 32 is automatically positioned and disposed on the outer surface of central tube member 20 and can move along at least a portion of the length of said tube member 20.

Linear mounting arm 90 is fixedly attached to handle assembly 50, and is disposed in substantially perpendicular orientation to the aligned longitudinal axes of handle assembly 50 and central tube member 20. Digital sensor mounting assembly 80 is slidably disposed on linear mounting arm 90 and forms a substantially U-shaped structure having first leg member 81, second leg member 82 and inner crown section 83. In a preferred embodiment, measurement notations or ruler indicia can be displayed on said linear mounting arm 90 and can reflect positioning of digital mounting assembly 80 relative to said linear mounting arm; for example, said ruler indicia can correspond to predetermined pipe diameter measurements.

Stepper motor 60 is attached to central tube member 20, while rotation gear 70 is attached to handle assembly 50. Said stepper motor 60 rotates a drive gear (not depicted in FIG. 2 or 3) operationally engaged with rotation gear 70; actuation of said stepper motor 60 results in application of torque forces to handle assembly 50, thereby causing handle assembly 50 to rotate about is longitudinal axis relative to adjacent central tube member 20.

Still referring to FIGS. 2 and 3, a plurality of sensors 45 are disposed along the inner surfaces of first leg member 81 (not visible in FIGS. 2 and 3), second leg member 82 and inner crown section 83 of digital sensor mounting assembly 80. Specific placement, positioning, orientation and focus of said sensors 45 can vary by application and intended use, but it is to be observed that said sensors 45 are generally directed or focused on a threaded connection of a pipe section.

By way of illustration, but not limitation, said sensors 45 can comprise digital cameras, digital sensors, image sensors, laser sensors or some combinations thereof. Additionally, lighting elements (such as, for example, a local diffused LED strip) can be provided on first leg member 81, second leg member 82, inner crown section 83 and/or handle assembly 50 to illuminate and direct additional light in the direction of a threaded connection being inspected by the apparatus of the present invention.

Figure 5:
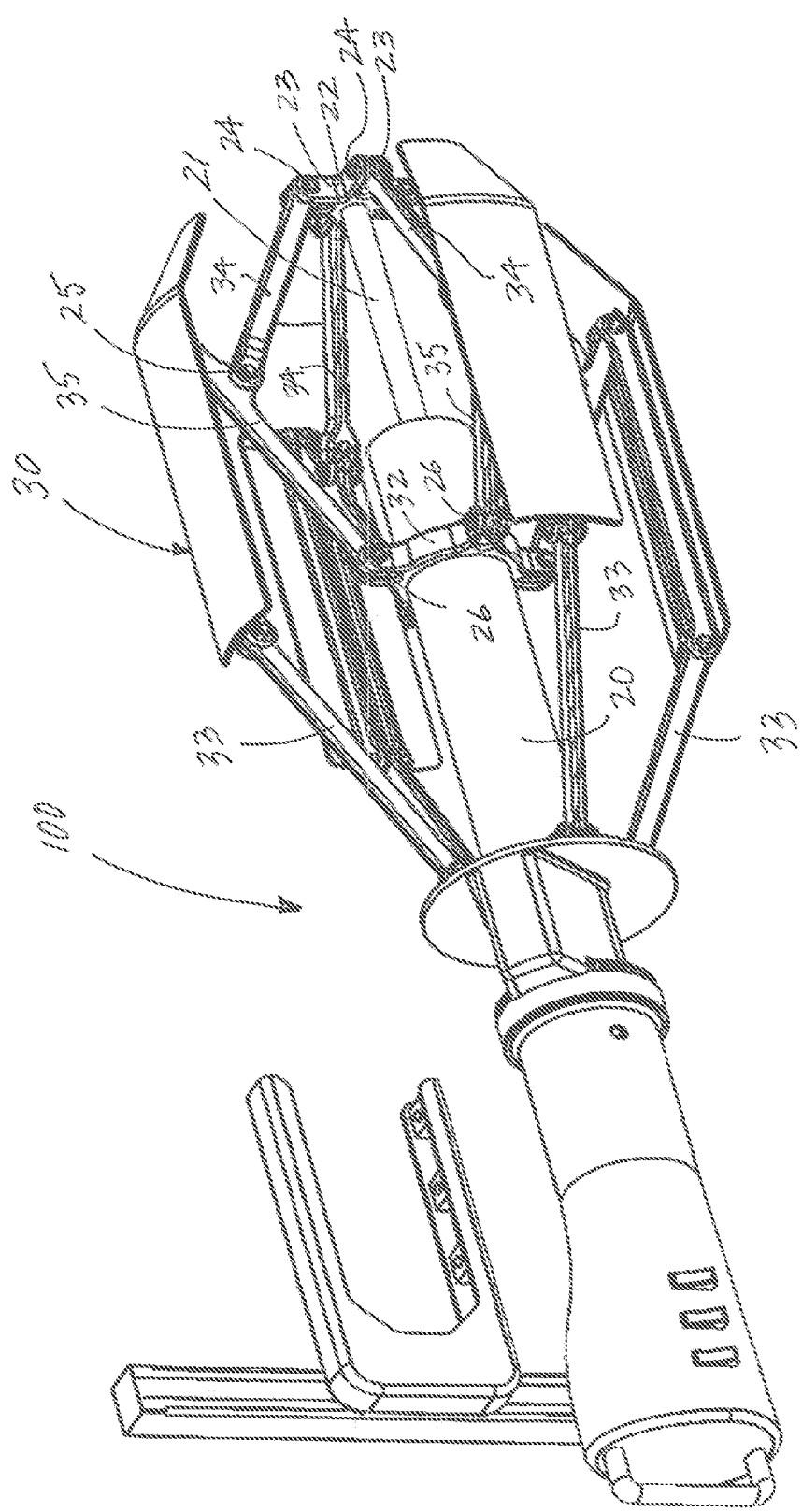
FIG. 5 depicts a rear perspective view of a digital inspection assembly of the present invention having a centralizer assembly in a substantially extended configuration.

FIG. 4 depicts a side view of a digital inspection assembly 100 of the present invention with centralizer assembly 30 in a substantially extended position. FIG. 5 depicts a rear perspective view of digital inspection assembly 100 of the present invention, while FIG. 6 depicts a front perspective view of said digital inspection assembly 100, with centralizer assembly 30 in a substantially extended position.

Figure 6:
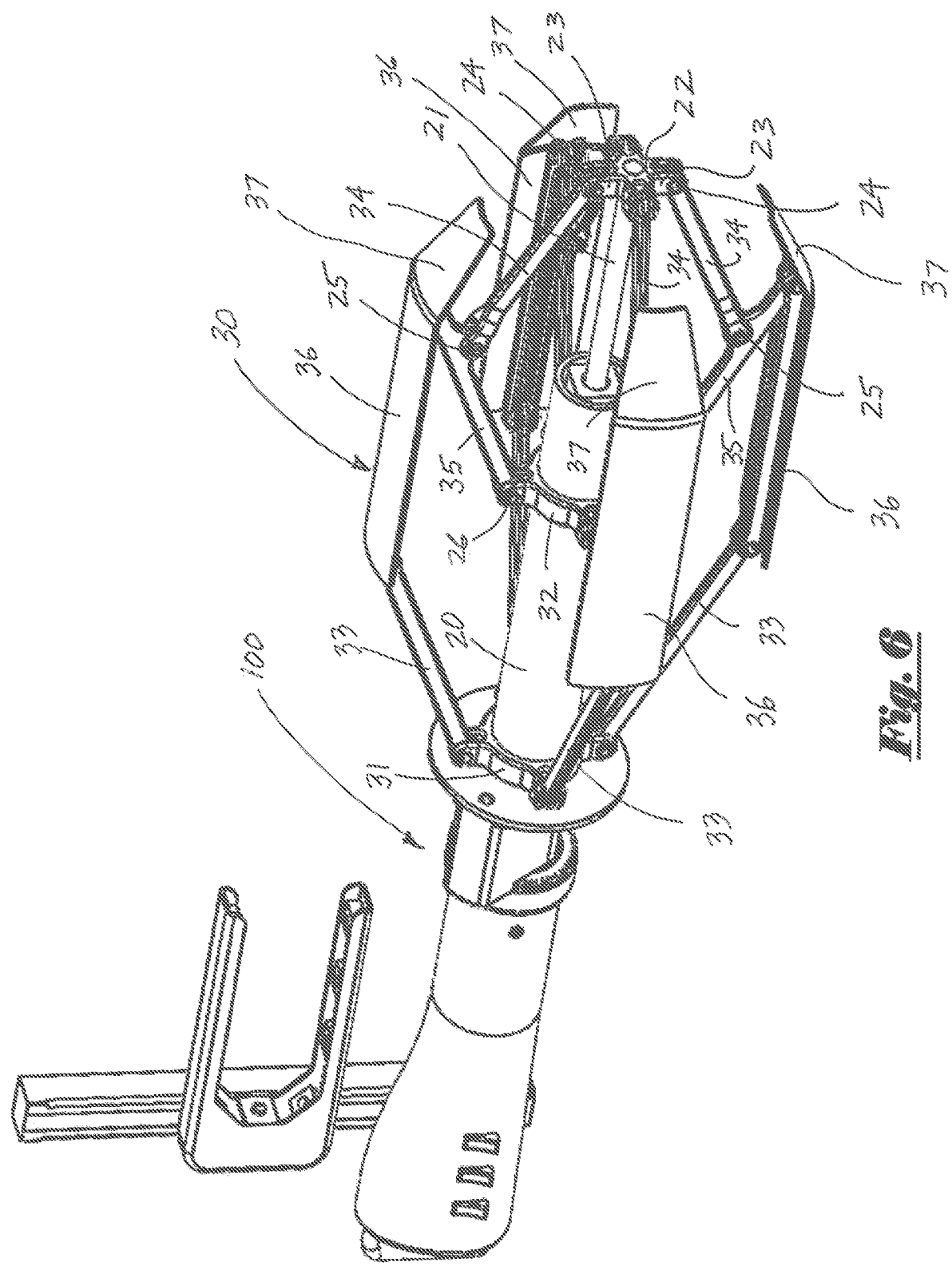
FIG. 6 depicts a front perspective view of a digital inspection assembly of the present invention having a centralizer assembly in a substantially extended configuration.

Referring to FIGS. 5 and 6, a fluid powered cylinder (such as, for example, a pneumatic or hydraulic powered cylinder) having a selectively extendable/retractable piston rod 21 is disposed within the inner bore or chamber of central tube member 20. Mounting bracket member 22 is disposed at the distal end of piston rod 21, while a plurality of clevis brackets 23 are disposed on said mounting bracket member 22. Lower rib members 34 are pivotally attached at one end to said clevis brackets 23 using pivot pins 24; said lower rib members 34 are pivotally attached to pusher rib members 35 (at the opposite end from said mounting bracket member 22) using pivot pins 25. Pusher rib members 35 are, in turn, pivotally attached to travelling collar 32 using pivot pins 26.

Still referring to FIGS. 5 and 6, selective extension of piston rod 21 forces mounting bracket member 22 in a direction away from central tube member 20. As said piston rod 21 is extended in this manner, force is applied to lower rib members 34. Such force is, in turn, applied to pusher rib members 35 and traveling collar 32, thereby causing said traveling collar to move axially along the length of said central tube member 20 in a direction that is generally away from stationary collar 31. Such action results in pad members 36 (including tapered nose section 37) being extended radially outward relative to the outer surface of said central tube member 20.

Figure 7:
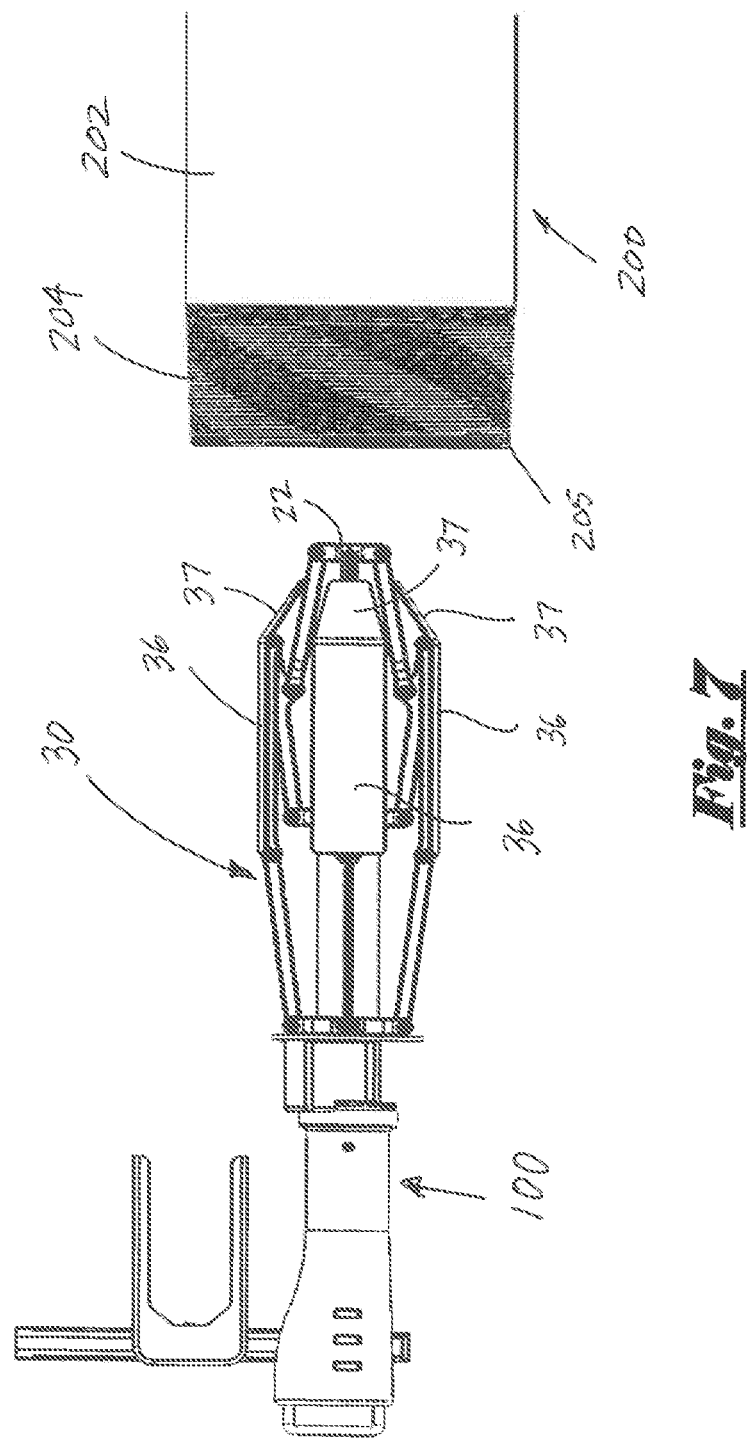
FIG. 7 depicts a side view of a digital inspection assembly of the present invention having a centralizer assembly in a substantially collapsed configuration being inserted into the central bore of a pipe section.
Figure 8:
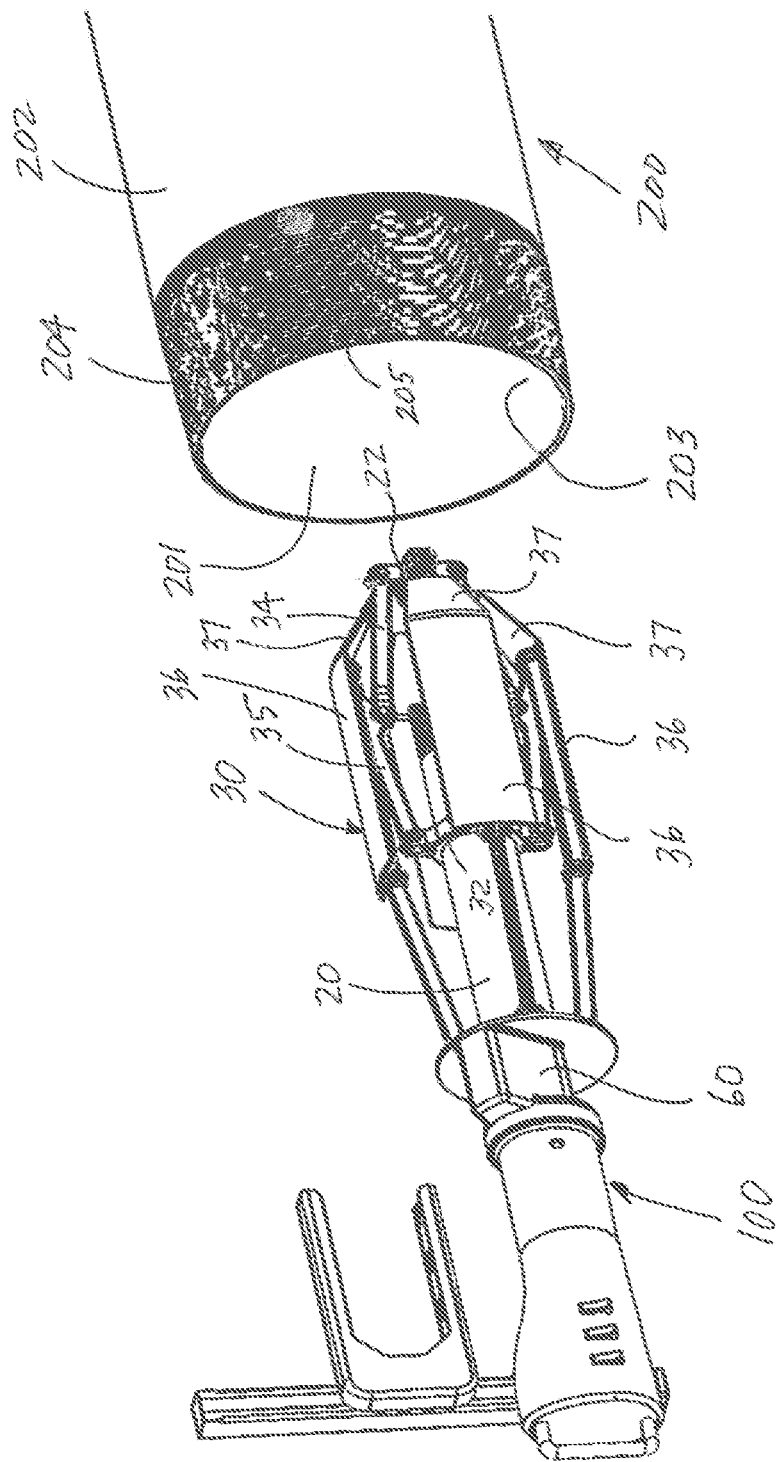
FIG. 8 depicts a rear perspective view of a digital inspection assembly of the present invention having a centralizer assembly in a substantially collapsed configuration being inserted into the central bore of a pipe section.
Figure 9:
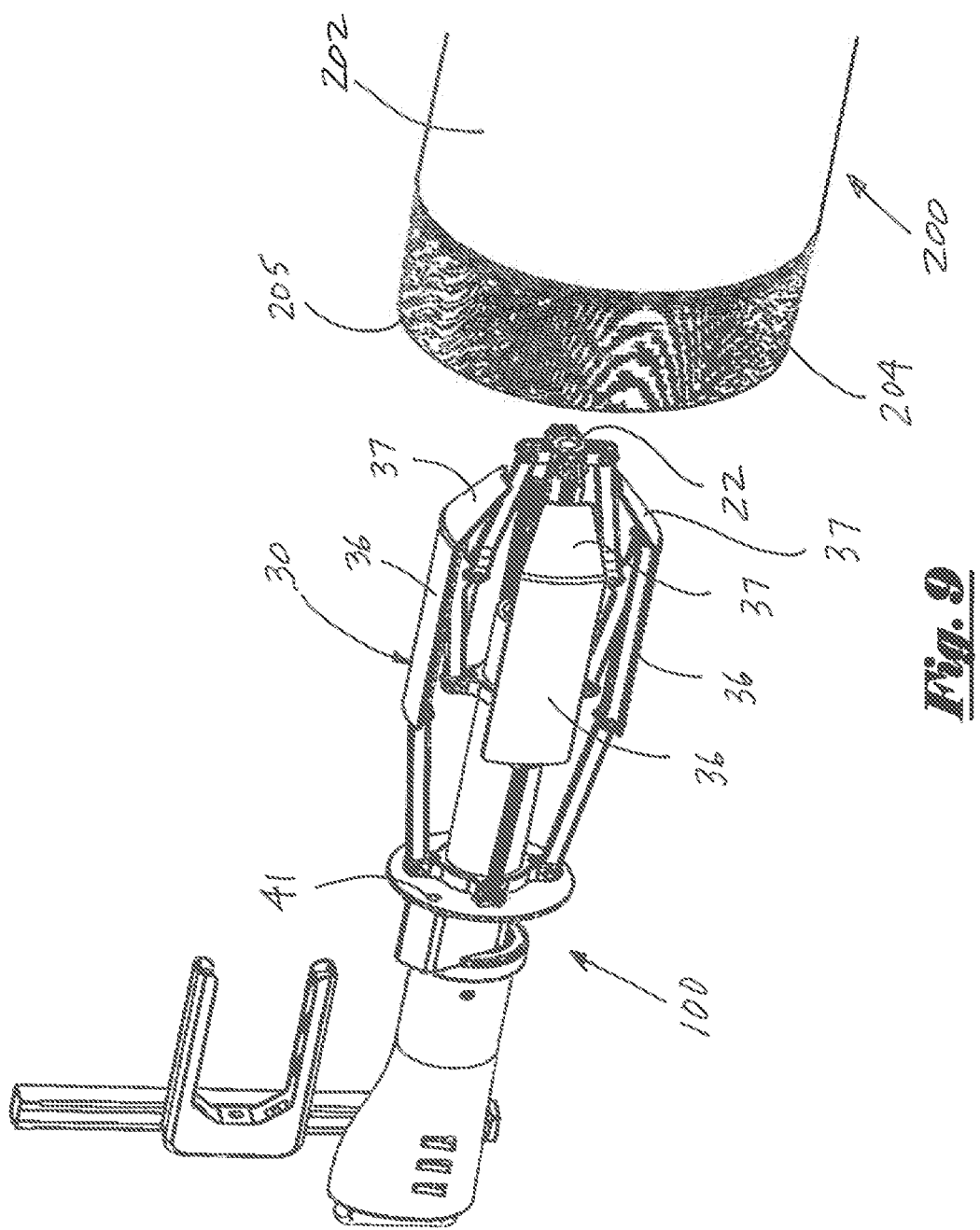
FIG. 9 depicts a front perspective view of a digital inspection assembly of the present invention having a centralizer assembly in a substantially collapsed configuration being inserted into the central bore of a pipe section.

FIG. 7 depicts a side view of a digital inspection assembly 100 of the present invention in a substantially collapsed position being inserted into pipe section 200. FIG. 8 depicts a rear perspective view of said digital inspection assembly 100 of the present invention in a substantially collapsed position being inserted into said pipe section 200, while FIG. 9 depicts a front perspective view of said digital inspection assembly 100 being inserted into said pipe section 200.

Referring to FIG. 8, pipe section 200 further comprises central bore 201, outer or external surface 202, inner surface 203 defined by said central bore 201 and external threads 204 disposed on a portion of said outer surface 202. Nose or end section 205 is formed by threads 204. Although said external threads 204 are depicted in FIGS. 7 through 9 as a male or "pin-end" threaded connection, it is to be observed that said threads can also comprise a female or "box-end" threaded connection without departing from the scope of the present invention.

Still referring to FIG. 8, although not visible in FIG. 8, piston rod 21 is substantially retracted causing mounting bracket member 22 to be positioned at or near central tube member 20. Lower rib members 34 act on pusher rib members 35 which, in turn, act on traveling collar 32, thereby forcing said traveling collar 32 axially along the length of said central tube member 20 in a direction that is generally toward stepper motor 60. Such action results in pad members 36 collapsing radially inward relative to the outer surface of said central tube member 20. In such a collapsed position, inwardly facing tapered nose sections 37 of pad members 36 cooperate to form a generally conical configuration, thereby acting as guides to help direct digital inspection assembly 100 into central bore 201 and prevent said pad members 36 from getting caught or "snagged" on pipe section 200.

Figure 10:
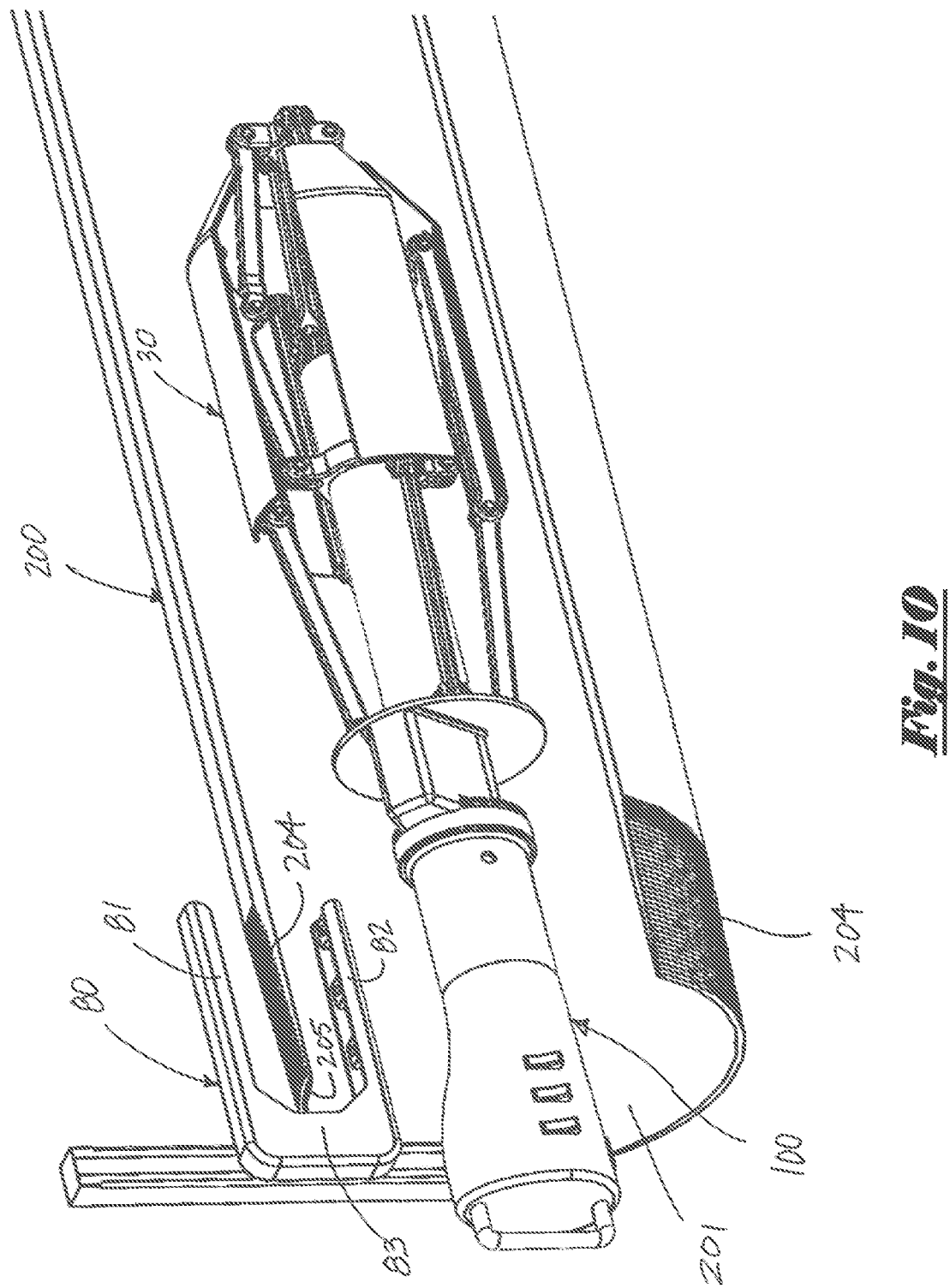
FIG. 10 depicts a rear perspective and partial cut-away view of a digital inspection assembly of the present invention having a centralizer assembly in a substantially collapsed configuration after being inserted into the central bore of a pipe section.

FIG. 10 depicts a rear perspective and partial cut-away view of digital inspection assembly 100 of the present invention in a substantially collapsed position after being inserted into central bore 201 of pipe section 200. With centralizer assembly 30 in this "collapsed" or retracted configuration, a portion of digital inspection assembly 100 can be inserted or received within central bore 201 of pipe section 200. As depicted in FIG. 10, when said digital inspection assembly 100 is partially received within said central bore 201, a portion of threads 204 (including nose 205) are received within substantially U-shaped structure of digital sensor mounting assembly 80; more specifically, a portion of said threads 204 are positioned between first leg member 81 and second leg member 82. Nose section 205 is generally positioned in proximity to inner crown section 83.

Figure 11:
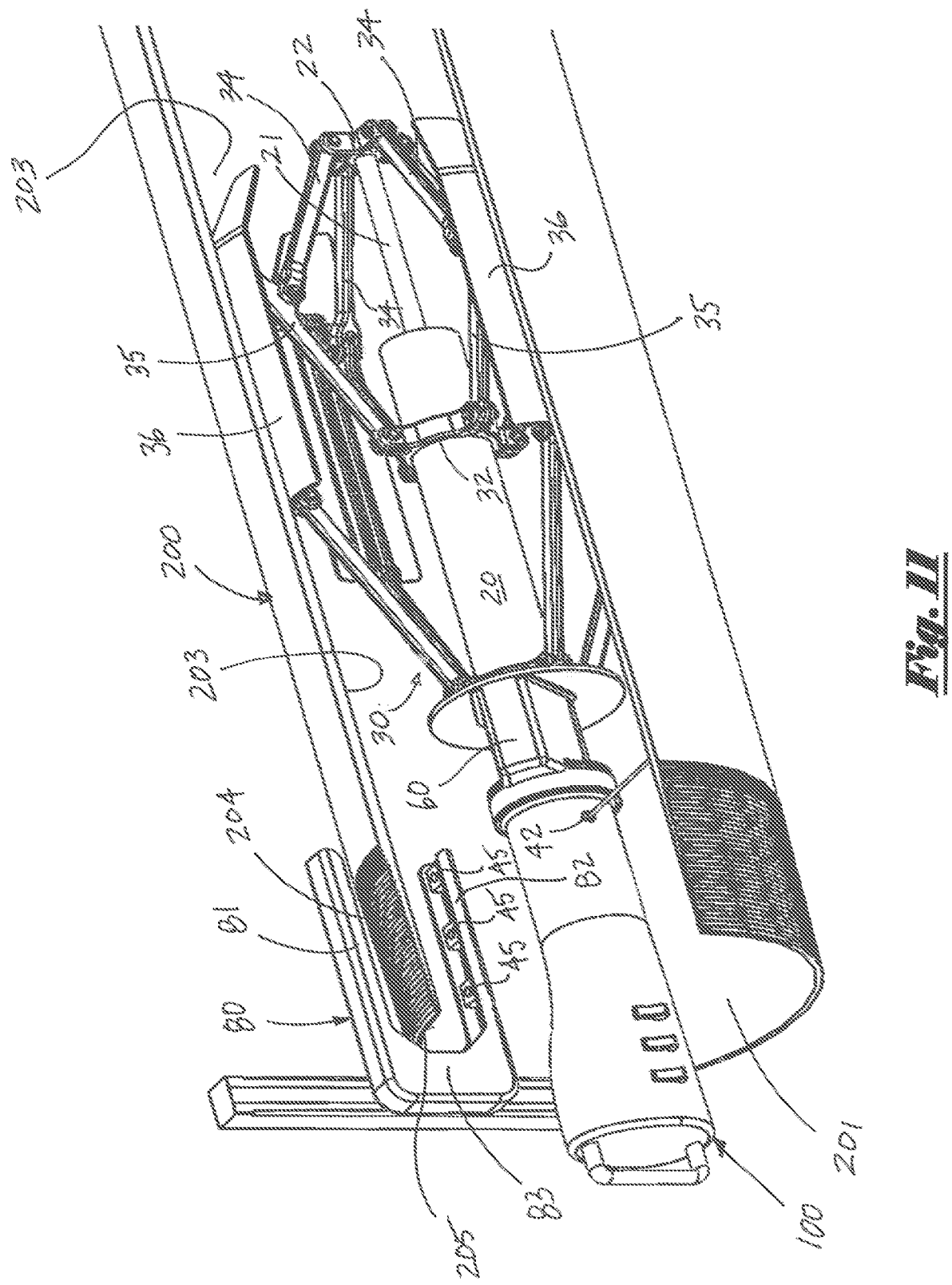
FIG. 11 depicts a rear perspective view and partial cut-away view of a digital inspection assembly of the present invention having a centralizer assembly in a substantially extended configuration after being inserted into the central bore of a pipe section.

FIG. 11 depicts a rear perspective and partial cut-away view of digital inspection assembly 100 of the present invention with centralizer assembly 30 in a substantially extended or expanded configuration after being inserted into central bore 201 of a pipe section 200. After said digital inspection assembly 100 is installed a desired distance within said central bore 201, selective extension of piston rod 21 forces mounting bracket member 22 away from central tube member 20 (that is, in a direction generally away from stepper motor 60).

In a preferred embodiment, said centralizer assembly 30 is a mechanical system that uses a combination of adjustable lever arm/rib assemblies, together with collars, to reliably centralize central tube member 20 relative to the inner surface 203 of a pipe section 200. As discussed herein, the diameter of said centralizer assembly 30 can be selectively increased and decreased. Specifically, as said piston rod 21 is selectively extended, force is applied to lower rib members 34, pusher rib members 35 and traveling collar 32, thereby causing said traveling collar 32 to move axially along the length of said central tube member 20 in a direction that is generally away from stepper motor 60. Such action results in pad members 36 extending radially outward relative to the outer surface of said central tube member 20 until said pad members 36 contact inner surface 203 of pipe section 200.

In a preferred embodiment, the curvature of the outer surfaces of said pad members 36 substantially conform to the curvature of the inner surface 203 of pipe section 200. The relatively large/increased surface area of said pad members 36, contact area between said pad members 36 and inner surface 203, and radially outward force applied to said pad members 36 by centralizer assembly 30 collectively results in creation of substantial frictional forces between said pad members 36 and pipe section 200, thereby securing digital inspection assembly 100 against axial and radial movement relative to pipe section 200. Once engaged against pipe section 200 as depicted in FIG. 11, said centralizer assembly 30 is configured to self-lock when pressure is applied so that the system remains rigid, axially stationary and does not roll or rotate along inner surface 203 of pipe section 200.

Figure 12:
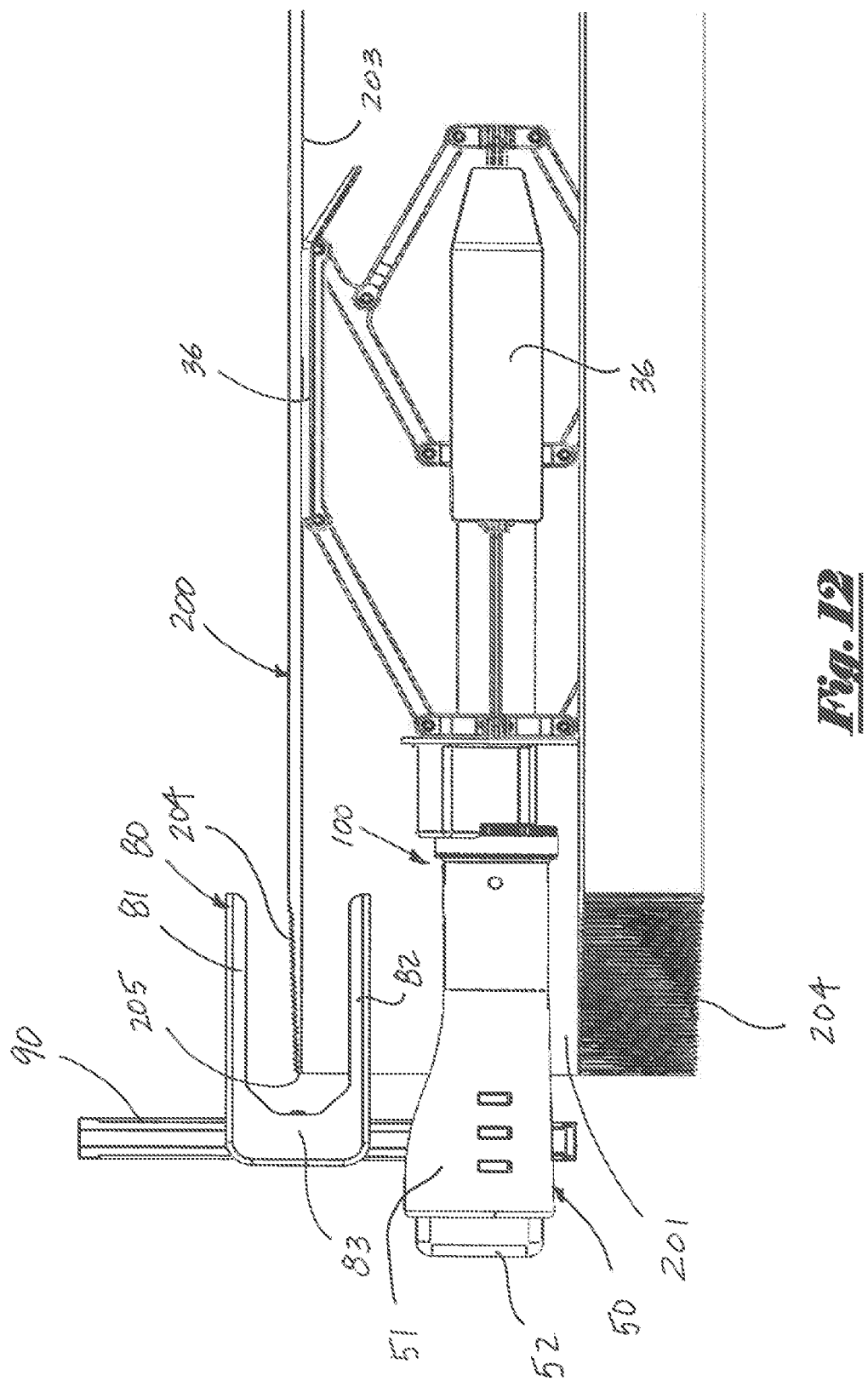
FIG. 12 depicts a side and partial cut-away view of a digital inspection assembly of the present invention having a centralizer assembly in a substantially extended configuration after being inserted into the central bore of a pipe section.

FIG. 12 depicts a side and partial cut-away view of a digital inspection assembly 100 of the present invention in a substantially extended position after being partially inserted into central bore 201 of a pipe section 200. As depicted in FIG. 12, when said digital inspection assembly 100 is partially received within said central bore 201 and centralizer assembly 30 is extended so that pad members 36 engage against inner surface 203 of pipe section 200, said digital inspection assembly 100 is secured against axial and radial movement relative to said central bore 201.

Digital sensor mounting assembly 80 can be selectively positioned along the length of linear mounting arm 90 so that a portion of threads 204 (including nose 205) of pipe section 200 are received within substantially U-shaped structure of digital sensor mounting assembly 80 (that is, between substantially parallel and opposing first leg member 81 and second leg member 82). Nose section 205 of threads 204 of pipe section 200 is generally positioned in proximity to inner crown section 83 of sensor mounting assembly 80.

FIG. 13 depicts a side (non-cutaway) view of said digital inspection assembly 100 after being partially inserted into a central bore of a pipe section. When said digital inspection assembly 100 is partially received within said central bore 201, digital sensor mounting assembly 80 can be selectively positioned along the length of linear mounting arm 90 so that a portion of threads 204 (including nose 205) of pipe section 200 are received within substantially U-shaped structure of digital sensor mounting assembly 80 between substantially parallel and opposing first leg member 81 and second leg member 82. Nose section 205 of threads 204 of pipe section 200 is generally positioned in proximity to inner crown section 83 of sensor mounting assembly 80.

FIG. 14 depicts a side view of digital inspection assembly 100 of the present invention during digital sensing of threads 204 and nose section 205 of pipe section 200. FIG. 15 depicts a rear perspective view of digital inspection assembly 100 after being partially inserted into central bore 201 of pipe section 200 during digital sensing of threaded connection 204 (including, without limitation, nose section 205) of pipe section 200.

Referring back to FIG. 12, handle assembly 50 comprises housing 51 for enclosing at least one microcontroller, electronics, processors, wiring and circuitry used to control various components and functions of digital inspection assembly 100 including, without limitation, motor driver interaction, local controls, sensor data routing, and local indication. Additionally, said handle assembly 50 includes electronic sensors that can be used to determine pipe length and pipe ID, as discussed below. At least one integrated handle grip member 52 permits easy and convenient transportation and/or manipulation of digital inspection assembly 100 during use and/or between operation of said apparatus.

Referring to FIG. 11, at least one sensor 45 used for data acquisition is disposed within first leg 81, second leg 82 and inner crown section 83 of digital sensor assembly 80. In a preferred embodiment, an array or plurality of sensors 45 can be used to capture visual images of long threads 204, and to eliminate any distortion due to perspective. By way of illustration, but not limitation, such sensors can comprise E-Con System's 5MP camera-board eCAM51, and/or a OV5640 CMOS sensor that can capture up to a 5MP photo. Additionally, such sensors 45 can beneficially include an autofocus feature for electronically adjusting focus to prevent any need for manual intervention or focusing.

Referring to FIG. 11, at least one laser distance sensor 42 can selectively measure distance and pipe ovality from handle member assembly 50 to inner surface 203 of pipe section 200; said sensor 42 can measure pipe ID. By way of illustration, but not limitation, said laser distance sensor 42 can accurately measure distances between 50 mm and 350 mm or more with a resolution of 0.05 mm. Referring to FIG. 9, at least one laser distance sensor 41 can also measure the length of pipe section 200 with a resolution of 0.02 mm. In certain applications, a reflector can be utilized at the opposite end of pipe section 200 from digital inspection assembly 100 for measurement accuracy.

In operation, tubular goods (such as pipe section 200) and connections are cleaned, prepared for a digital inspection process and, when necessary, moved to an inspection station. Digital inspection assembly 100 can be calibrated in accordance with applicable specifications or predetermined standards. Pipe or other tubular goods can be moved into a desired position for digital thread inspection by mechanical or human intervention. In a preferred embodiment, integrated and automated racks with centering devices can be utilized, including a 3-point stabilization system to alleviate bending moments in said pipe or other tubular goods.

Referring to FIG. 10, digital inspection assembly 100 is partially received within said central bore 201 of pipe section 200. Referring to FIG. 11, centralizer assembly 30 is selectively extended so that pad members 36 engage against inner surface 203 of pipe section 200; in this manner, central body member 20 of said digital inspection assembly 100 is centralized within said bore 201 and secured against axial and radial movement relative to said central bore 201.

Still referring to FIG. 11, digital sensor mounting assembly 80 is selectively positioned along the length of linear mounting arm 90 so that a portion of threads 204 (including nose 205) of pipe section 200 are received within substantially U-shaped structure of digital sensor mounting assembly 80 (that is, between substantially parallel and opposing first leg member 81 and second leg member 82). Nose section 205 of threads 204 of pipe section 200 is generally positioned in proximity to inner crown section 83 of sensor mounting assembly 80.

Once secured in this manner, digital thread inspection assembly 100 of the present can begin the thread inspection process. Specifically, stepper motor 60 can be selectively actuated to drive rotation gear 70, thereby causing handle assembly 50 and attached sensor mounting assembly 80 to rotate relative to stationary central body member 20. Such rotation permits sensor mounting assembly 80 to rotate 360-degrees, thereby permitting sensors 45 to acquire data around the full circumference of threaded connection 204.

The present invention can engage pin and box connections simultaneously through remote automation. Proprietary software properly aligns the digital thread inspection assembly with said connections for optimal imaging and laser sensing and data acquisition. The automated digital thread inspection assembly 100 of the present invention can capture a 360-degree image and sense data to verify the attributes of pipe ID, OD, pin nose, seal areas, threaded areas, box face, coupling face, ovality, laser length, and pipe ID measurements of a pipe section or tubular in real time.

The digital thread inspection assembly of the present invention can capture connection images with digital cameras, lasers scanners or sensors, ultrasonic transducer(s) ("UT") and/or phased array technology via the custom designed automated rotation device. Recorded data can be transmitted real time via cables or wireless transmission to a control station and/or to remote monitoring stations. Said control station houses the computer systems and monitors, with all peripheral equipment associated with the apparatus of the present invention.

Proprietary software can compare all measured or input data against predetermined standards or specifications to verify that all attributes are within OEM specifications. Defects noted can be highlighted and referenced on an image to show position on the screen in relation to Azimuth headings on a pipe section or tubular good for quick verification. Defects noted can be stored and all repairs re-scanned and compared to a predetermined OEM standard Software will automatically store all measured or input data received and compare such data to the standard for a "real time" go/no-go determination. Additionally, a mobile application can be implemented for additional remote access and monitoring. When two opposing digital inspection assemblies are utilized (one at each end of a pipe section), said two-station assemblies can be synced with each other for inspection optimization. In such scenarios, multiple threaded connections can be inspected simultaneously, with lighting, imaging, motor automation and laser applications working together, while being controlled from a common or central control panel.

The digital inspection assembly of the present invention can be portable, allowing for mobile deployment and use at virtually any location (such as, for example, pipe yards, mills, rigs, remote or other locations). In alternative embodiments, said digital inspection assembly can be hand held, mounted to a temporary support structure, or permanently supported via an automated and/or robotic arm structure.

Measured data can be stored and utilized with an automated pipe grade verification system, and/or stored on a cloud-based data storage system. Further, such measured data can be accessed for comparison and/or verification of multiple conditions including, without limitation, that threaded connection attributes are within OEM or other predetermined standards for acceptable connection tolerances, that ovality is within desired API or other specifications or standards, and/or that connection tolerances for mating pin and box connections will ensure optimal connection performance in operation. Additionally, data from laser topography and/or digital optical sensor(s) can verify that any defects are within acceptable tolerances relative to OEM specifications and/or other applicable standards.

Additionally, real time data acquisition and Wi-Fi connectivity allows for remote viewing of measured data worldwide (including, without limitation, GSM, 3G, 4G, Bluetooth, Wi-Fi, satellite and/or cabled networks). PDF or other specific application conversion of all images, lengths, defects, acceptance criteria and all system set up parameters for electronic report generation and delivery. Said assembly can beneficially operate off of external power and does not require an internal battery for operation.

The digital inspection assembly of the present invention can permit inspection of multiple attributes of male and/or female threaded connections including, without limitation, the following: thread image, nose image, seal area, shoulders, relief grooves, roots, crests, pitch (including variable pitch), diameter, pipe OD, pipe ID, pipe ovality and/or other measurable variables. A report containing captured data and any analysis can be automatically generated and forwarded to desired recipients. Connection inspection information can be numbered, time-stamped and dated.

In a preferred embodiment, the digital inspection assembly of the present invention can be operated and utilized by a single person. Further, the digital inspection assembly is accurately repeatable (i.e. duplicate inspections of the same pipe/connection will yield identical results within measurement tolerances).

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A digital inspection assembly for inspecting a threaded connection of a pipe section comprising:
   a) an elongate body member;
   b) a centralizer assembly operationally attached to said elongate body member, wherein said centralizer assembly is configured to selectively alternate between a first radially collapsed position, and a second radially extended position wherein said elongate body member is centralized inside said pipe section; and
   c) at least one data acquisition sensor operationally attached to said body member and configured to acquire data regarding said threaded connection;
   d) a sensor mounting assembly comprising a substantially U-shaped member having a first leg and a second leg, wherein said first and second legs are positioned in substantially parallel orientation to each other and define a gap configured to receive a portion of said threaded connection, and wherein said data acquisition sensor is operationally attached to said sensor mounting assembly.

2. A method for inspecting a threaded connection of a pipe section comprising:
   a) inserting a digital inspection assembly into a central bore of a pipe section, wherein said digital inspection assembly comprises:
      i) an elongate body member;
      ii) a centralizer assembly operationally attached to said elongate body member, wherein said centralizer assembly is configured to selectively alternate between a first radially collapsed position, and a second radially extended position wherein said elongate body member is centralized inside said pipe section; and
      iii) at least one data acquisition sensor operationally attached to said body member and configured to acquire data regarding said threaded connection;
      iv) a substantially U-shaped member having a first leg, a second leg and defining a gap between said first leg and second leg configured to receive a portion of said threaded connection;
   b) shifting said centralizer assembly from said first collapsed position to said second extended position, wherein said centralizer assembly engages against an inner surface of said pipe section;
   c) acquiring data regarding said threaded connection using said at least one data acquisition sensor; and
   d) rotating said data acquisition assembly relative to said central body member.

3. The method of claim 2, wherein said acquired data comprises at least one optical image of threads, thread nose, seal area, shoulders, relief grooves, roots, crests, pitch (including variable pitch), pipe outer diameter, pipe inner diameter, pipe ovality or some combination thereof.

4. The method of claim 2, wherein said at least one data acquisition sensor comprises a digital camera, laser scanner, optical sensor, ultrasonic transducer, or some combination thereof.

5. The method of claim 2, wherein said at least one data acquisition sensor is oriented in a phased array.

6. The method of claim 2, wherein said body member is centralized within said bore of said pipe section, and secured against axial or rotational movement, when said centralizer assembly is in said second position.

7. The method of claim 2, further comprising measuring the length, the internal diameter or ovality of said pipe section using at least one laser measurement tool.

8. The method of claim 2, further comprising comparing data acquired using said at least one data acquisition sensor against predetermined values.

* * * * *